Aug. 5, 1958 C. H. HEUER ET AL 2,846,499

COLOR TELEVISION TRANSMITTER

Filed Oct. 13, 1952 6 Sheets-Sheet 1

CHARLES H. HEUER
JOHN L. RENNICK
*INVENTORS.*

BY Francis W. Crotty

THEIR ATTORNEY.

CHARLES H. HEUER
JOHN L. RENNICK
INVENTORS.
BY Francis W. Crotty
THEIR ATTORNEY.

CHARLES H. HEUER
JOHN L. RENNICK
*INVENTORS.*
BY Francis W. Crotty
THEIR ATTORNEY.

CHARLES H. HEUER
JOHN L. RENNICK
*INVENTORS.*
BY Francis W. Crotty
THEIR ATTORNEY.

CHARLES H. HEUER
JOHN L. RENNICK
*INVENTORS.*

BY Francis W. Crotty

THEIR ATTORNEY.

COLOR TELEVISION TRANSMITTER

Filed Oct. 13, 1952 6 Sheets-Sheet 6

CHARLES H. HEUER
JOHN L. RENNICK
*INVENTORS.*

BY Francis W. Crotty
THEIR ATTORNEY.

United States Patent Office 2,846,499

Patented Aug. 5, 1958

2,846,499

COLOR TELEVISION TRANSMITTER

Charles H. Heuer, Winnetka, and John L. Rennick, Elmwood Park, Ill., assignors to Zenith Radio Corporation, a corporation of Delaware Application October 13, 1952, Serial No. 314,506

10 Claims. (Cl. 178—5.4)

This invention relates to a new and improved color television system and is particularly concerned with a gamma-correction arrangement to be incorporated in the transmitter of such a system. Although the invention is applicable to dot-sequential, or simultaneous color television systems, it is particularly valuable when employed in connection with a color telecast of the general type currently proposed by the National Television System Committee, and will be described in that environment.

In the color television system formulated by the National Television System Committee, commonly referred to as the NTSC system, the color and luminance information pertaining to a scanned image are segregated and transmitted as individual signals interleaved within a portion of the frequency spectrum. At the transmitter, three color-image signals representative of a scanned image are combined in a fixed ratio to form a brightness signal. At the same time, a plurality of color-difference signals are developed, each individually corresponding to the amplitude difference between one of the color-image signals and a predetermined portion of the brightness signal, that predetermined portion presently being established as the complete brightness signal. A system of this basic type is described in the copending application of John L. Rennick, Serial Number 215,761, filed March 15, 1951, and assigned to the same assignee as the present application. The color-difference signals represent the hue and saturation values of the color components included in the image, whereas the brightness signal represents the luminance of the various parts of the image. Although the ultimate transmission standards have not as yet been standardized, but are still somewhat flexible, it is generally considered that the brightness or monochrome signal and the essential information representing only two of the color-difference signals will be transmitted, since the third color-difference signal may then be derived at the receiver, due to the fixed mathematical relationship existing between the monochrome signal and each of the color-difference signals.

In constructing a color television receiver for utilizing a telecast of this general type, it has been customary to provide means for deriving the monochrome signal and the three color-difference signals. These signals are then employed directly to control the operation of an image-reproducing system which may include either a single tri-color cathode-ray tube having three electrode systems or a single electrode system, such as that disclosed in the copending application of John L. Rennick, Serial Number 226,125, filed May 14, 1951, and assigned to the same assignee as the present invention, or three single-color cathode-ray tubes and an optical system for combining the three colored images produced thereby. In these image-reproducing arrangements, difficulty is encountered because of mis-registration and consequent color fringing. This situation is emphasized by the fact that all of the reproducing devices employed utilize the total-definition monochrome signal, with the result that any variations in image registration are accentuated. The problem becomes particularly acute when the subject-matter of the image is essentially uncolored; e. g., where the scanned image is composed mostly of shades of black and white. When such an image is transmitted, any registration misalignment present in the system may cause color fringing, which appears as colored lines, dots, or other areas in the reproduced image, since white light may only be developed by the image reproducers by exact superpositioning of the output of three primary-color light sources.

In order to obviate the deficiencies due to mis-registration and color fringing, which appear to be inherent in three-color receivers, it has been proposed that reproduction of the television image be carried out in accordance with the so-called "four-color" method of reproduction. In a receiver of this type, all of the white or achromatic portions of the televised image and, preferably, the equi-chromatic parts of the colored portions of the image also are reproduced by a black-white image-reproducing means, while the saturation components of the image are reproduced by colored light generating means. A receiver of this type is described and claimed in the copending application of Charles H. Heuer and John L. Rennick, Serial Number 300,894, filed July 25, 1952, and an image reproducer or cathode-ray tube suitable for use in the receiver is described and claimed in the copending application of Charles H. Heuer and John L. Rennick, Serial Number 315,476, filed October 18, 1952, now abandoned; both of these applications are assigned to the same assignee as the present invention.

A receiver of the type described in the above-noted Heuer and Rennick applications provides a satisfactory reproduction of a telecast conforming to the proposed NTSC methods. However, the image reproduced tends to be somewhat undercolored; this is due to the fact that the NTSC system provides for modification of the telecast at the transmitter, in accordance with known non-linearities exhibited in receivers of the familiar cathode-ray tube type. This signal modification, known in the art as gamma correction, is applied to the primary color signals and produces gamma-corrected color signals which are radiated and which correspond to the actual reproduction signals in a three-color receiver. The "four-color" receiver, on the other hand, uses a group of reproduction signals which are derived by additive processes from the gamma-corrected signals present in the receiver; as a result, the reproduction is not theoretically accurate and actually may become somewhat undercolored.

It is an object of this invention, therefore, to provide a new and improved color television system and especially a transmitter for such a system which avoids one or more of the aforementioned limitations of prior arrangements.

It is another object of this invention to provide a color television transmitter which effectively corrects a radiated colored telecast in accordance with the non-linearities inherent in a "four-color" type of television receiver.

It is a further object of this invention to provide a gamma-correction system for a color television transmitter which operates on saturated color signals instead of desaturated or primary color signals.

It is an additional object of the invention to provide a gamma-correction system for a color television transmitter which applies a non-linearity correction to a signal representative of the total achromatic and equi-chromatic content of an image.

It is a corollary object of the invention to provide a gamma-correction system for a color television transmitter which corrects signals representative of the control or reproduction signals employed in a "four-color" receiver.

It is a further object of the invention to provide a gamma-correction system for a color television transmitter which is effective to correct the radiated signal in accordance with the non-linearities of a "four-color" receiver and which is relatively simple and expedient to assemble and economical to manufacture.

The present invention provides a gamma-correction system for incorporation in a color television transmitter including an image-analyzing system which develops a plurality of primary color signals instantaneously representative of the color and luminance of elemental portions of a scanned image. The gamma-correction system comprises a selector network, coupled to the image-analyzing system, for deriving a desaturation signal instantaneously determined by the smallest of the primary color signals. Matrix means are coupled to the selector network and to the image-analyzing system to additively combine the desaturation signal with each of the primary color signals and derive a corresponding plurality of saturated color signals. The saturated color signals are supplied to an exponential amplifying system which develops a corresponding plurality of gamma-corrected saturated color signals, means are coupled to the exponential amplifying system for utilizing the gamma-corrected saturated color signals to derive at least two gamma-corrected color-difference signals.

The features of the invention which are believed to be novel are set forth with particularity in the appended claims. The organization and manner of operation of the invention itself, together with further objects and advantages thereof, may best be understood by reference to the following description taken in conjunction with the accompanying drawings, in which:

For reasons that will become apparent as the description proceeds, it is appropriate to consider initially the structure of the receiver which may utilize the transmitted signal emanating from any of the several embodiments of the transmitter constructed in accordance with the invention for the transmission of color telecasts.

Figure 1:
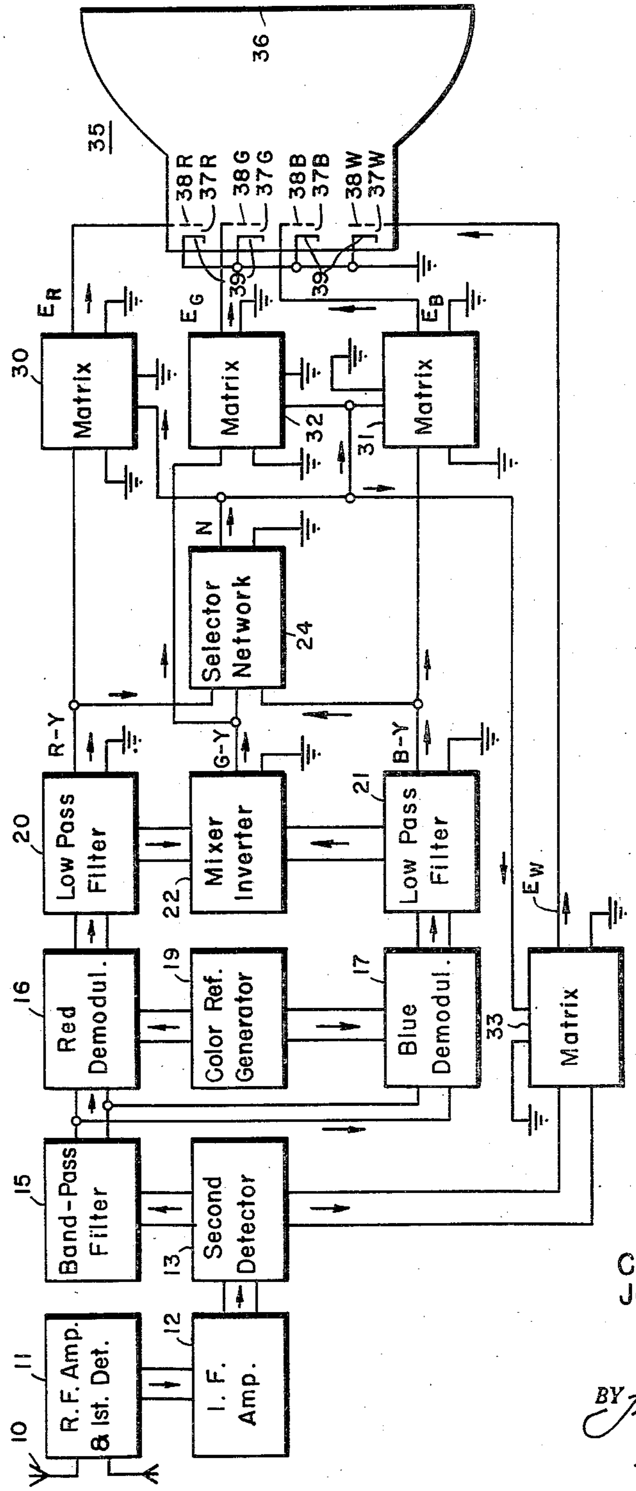
Figure 1 is a block diagram, partially schematic, of a "four-color" television receiver.

The color television receiver illustrated in Figure 1 includes an antenna 10, a radio-frequency amplifier and first detector 11, and an intermediate-frequency amplifier 12; these elements are coupled together in series, with the output circuit of intermediate-frequency amplifier 12 coupled to a second detector 13. Two sets of output terminals are provided for second detector 13, one set being connected to a band-pass filter 15. The output stage of filter 15 is coupled to the input circuits of a red demodulator 16 and a blue demodulator 17, and a color reference generator 19 is also coupled to the demodulators. The output circuits of demodulators 16 and 17 respectively are connected to two low-pass filters 20 and 21, and a mixer-inverter 22 is also coupled to the two filters. The output stages of low-pass filters 20 and 21 and of mixer 22 are all coupled to a selector network 24; in addition, these output stages are individually connected to three matrices 30, 31 and 32 respectively. The term matrix, as employed throughout this specification and in the appended claims, comprises a network or device for additively combining two signals to derive a signal representative of their algebraic sum or difference and may take the form of a resistance network or any other suitable type of combining means known to the art. The output circuit of selector network 24 is also coupled to each of the three matrices 30–32. Selector network 24 is also coupled to another matrix 33 which is in circuit with the second set of output terminals of second detector 13.

An image reproducing system 35 is included in the receiver and comprises a cathode-ray tube having a screen 36 and four electrode systems 37R, 37G, 37B and 37W. Screen 36 is generally similar to any of the well known types of color screens employed in cathode-ray television tubes in that it comprises a plurality of groups of elemental areas such as dots or lines of phosphorescent material, each group exhibiting an electron-bombardment response characteristic individually corresponding to one of the primary additive colors; however, an additional group of phosphorescent elements, which emit white light when excited, are interspersed with the color areas to form a repetitive "four-color" pattern. Each of the electrode systems 37 includes a control electrode 38, these electrodes being designated 38R, 38G, 38B, and 38W respectively. Four cathodes 39 are individually associated with control electrodes 38 and are connected to a source of reference potential. A deflection system for simultaneously deflecting the cathode-ray beams developed by electrode systems 37 to scan screen 36 is included in image-reproducing system 35 but has been omitted from the drawings for purposes of simplification and clarification. It will be recognized by those skilled in the art that certain other elements normally present in a television receiver, such as screen biasing, beam converging, and focusing arrangements, have been omitted for similar reasons.

In order fully to comprehend the operation of the receiver of Figure 1, a brief description of the general type of telecast which the receiver is intended to reproduce and the electrical quantities or reproduction signals derived in the receiver is desirable. At the outset, it is assumed that the receiver includes only elements having a linear response; that is to say, the light output of image reproducer 35 is directly proportional to an applied electrical signal. In describing the receiver, the following definitions are employed:

R, B and G represent primary color image signals instantaneously representative of the color and luminance of elemental portions of the image to be reproduced and correspond to the primary colors of an additive color system. Y is a brightness or monochrome signal of the type employed in the proposed NTSC color television system and represents an additive combination of the three primary color signals R, B and G according to a preselected ratio. E represents the received telecast, exclusive of the transmission carrier-frequency signal, and includes both the brightness signal and a plurality of color difference signals of the form $R-Y$, $B-Y$ and $G-Y$ which contain hue and saturation information. N is a signal operator instantaneously determined by the smallest of the primary color signals and may be defined as a color-difference desaturation signal, as will be more clearly indicated hereinafter.

A constant-luminance system is incorporated within the NTSC proposal; the basic equation for an approximate constant-luminance system may be expressed as follows:

$$(1) \qquad Y-0.1B+0.6G+0.3R$$

According to currently proposed standards, the signal form of the received telecast, disregarding the transmission carrier, may be represented by the general equation $$(2) \qquad E=Y+K([K_1(R-Y)+K_3(B-Y)] \sin wt+[K_4(R-Y)+K_2(B-Y)]\cos wt)$$

in which K, $K_1$, $K_2$, $K_3$ and $K_4$ are all constants. The

NTSC proposal, however, contemplates use of a somewhat simplified signal form in which $K_3$ and $K_4$ may be equal to zero; thus, the basic telecast equation reduces to:

$$(3) \quad E=Y+K[K_1(R-Y) \sin wt + K_2(B-Y) \cos wt]$$

It should be noted that these standards also require that Y, the luminance signal, be transmitted with the same degree of definition as in present day monochrome telecasts, whereas the definition of the color-difference signals R—Y and B—Y is materially reduced. It may be shown that in the receiver, the following relationships are established:

$$(4) \quad E_R=(R-Y)+N=R-W$$
$$(5) \quad E_B=(B-Y)+N=B-W$$
$$(6) \quad E_G=(G-Y)+N=G-W$$
$$(7) \quad E_W=Y-N=W$$

in which $E_W$ is the control or reproduction signal applied to electrode system 37W and $E_R$, $E_B$ and $E_G$ represent the reproduction signals applied to electrode systems 37R, 37B and 37G respectively.

A series of calculations based on the above definitions and equations produces the following illustrative results:

*Color to be reproduced*

| Signal Designation | Red | White | Yellow | Orange | Unsaturated Red-Blue |
|---|---|---|---|---|---|
| R | 1 | 1 | 1 | 1 | 1 |
| B | 0 | 1 | 0 | 0 | .5 |
| G | 0 | 1 | 1 | .5 | .2 |
| Y | .3 | 1 | .9 | .6 | .47 |
| R—Y | .7 | 0 | .1 | .4 | .53 |
| B—Y | —.3 | 0 | —.9 | —.6 | .03 |
| G—Y | —.3 | 0 | .1 | —.1 | —.27 |
| N | .3 | 0 | .9 | .6 | .27 |
| $E_R$ | 1 | 0 | 1 | 1 | .8 |
| $E_B$ | 0 | 0 | 0 | 0 | .3 |
| $E_G$ | 0 | 0 | 1 | .5 | 0 |
| $E_W$ | 0 | 1 | 0 | 0 | .2 |

It is immediately apparent from the foregoing data that the signal W, ignoring amplification and non-linearities of the system, is equal in absolute value to the smallest of the three primary color signals R, B and G and represents the amount of color-desaturated or white light present in each instantaneous element of the reproduced image; signal W may therefore be termed a color desaturation signal.

When the receiver of Figure 1 is placed in operation a telecast comprising a carrier wave modulated with information corresponding to Equation 3 is received at antenna 10, amplified and heterodyned in system 11 to develop an intermediate-frequency signal, and applied to intermediate-frequency amplifier 12. The intermediate-frequency signal, after amplification, is applied to second detector 13, wherein it is demodulated to derive a composite signal corresponding to Equation 3.

The output signal of detector 13 is supplied to band-pass filter 15 which effectively blocks out the majority of the monochrome signal "Y" and furnishes the remaining information, primarily representative of color data, to demodulators 16 and 17. In red demodulator 16, the information contained in the output signal from band-pass filter 15 is demodulated and is then applied to low-pass filter 20 to derive the color-difference signal represented as *R—Y*. The signal developed in color reference generator 19 is supplied to red demodulator 16 to enable the demodulator to carry out this operation; at the same time, a color reference signal is applied to blue demodulator 17 to effect detection of the blue chrominance information contained in the received telecast. The output of blue demodulator 17 is supplied to low-pass filter 21 to derive the blue color-difference signal *B—Y*. Color-difference signals *R—Y* and *B—Y*, which comprise the output signals of filters 20 and 21 respectively, are applied to mixer-inverter 22, which combines these two signals to develop the third color-difference signal *G—Y*. The operation and construction of all of these elements are generally well understood in the art and any effective means for deriving the color-difference signals may be employed without adversely affecting the operation of the receiver.

The color-difference signals developed in circuits 20, 21 and 22 are all supplied to selector network 24. The selector network compares the instantaneous values of those signals and derives therefrom a signal representative of color-difference desaturation signal N as defined above. Signal N, which is instantaneously proportional in absolute value to that color-difference signal corresponding to the instantaneously smallest of the three primary color-image signals, R, G, and B, is applied to each of the three matrices 30, 31 and 32. In matrix 30, desaturation signal N is combined with the color-difference signal *R—Y* from low-pass filter 20 to develop a color-control signal corresponding to the algebraic sum of *R—Y* and *N*. This latter color-control signal is equivalent to the signal $E_R$ as defined above; similarly, matrices 32 and 31 combine signal N with color-difference signals *G—Y* and *B—Y* to develop color-control signals $E_G$ and $E_B$ respectively.

Desaturation signal N, developed in network 24, is also applied to matrix 33, and, at the same time, the signal developed in second detector 13 is likewise supplied to the matrix. The brightness or monochrome signal Y predominates in the output of the second detector and the signal may therefore be considered as the equivalent of the monochrome signal. If preferred, a low-pass filter may be included in circuit between second detector 13 and matrix 33 to remove some of the chromaticity information from the output signal of the detector, but this is not essential. In matrix 33, desaturation signal N and brightness signal Y are combined to develop a color desaturation control signal $E_W$ equivalent to W. Control signal $E_W$ is applied to control electrode 38W to modulate the intensity of the cathode-ray beam developed by electrode system 37W. The beam from system 37W is aligned to impinge upon elemental areas W of screen 36 which, when excited, emit an achromatic or white light. At the same time, the signals $E_R$, $E_G$, and $E_B$ are applied to control electrodes 38R, 38G and 38B respectively and are employed to regulate the intensity of the cathode-ray beams developed by electrode systems 37R, 37G, and 37B, which are focused upon the red, green and blue phospher groups R, G, and B of screen 36.

Color desaturation signal W represents all of the picture information which is essentially achromatic; that is to say it represents completely those portions of the image in which the three primary colors are equally effective. In addition, signal W also contains part of the information relating to the desaturated portions of the picture in which the three primary colors are all present but are not equally effective. These portions of the image are developed by a combination of white light plus one or two of the primary colors. The receiver of Figure 1 corresponds in all essential respects to that described in the aforementioned copending Heuer-Rennick application Serial Number 300,894 and the image-reproducing system may be of the form described in their application Serial Number 315,476, also noted above.

One type of transmitter for generating a telecast in accordance with the proposed NTSC system is described in "Electronics," volume 25, No. 2, dated February 1952, at pages 88–95. As indicated in that publication, each of the primary color signals R, B and G is altered in form prior to the formation of the telecast, this step being referred to as gamma-correction. Correction is necessitated by the fact, among others, that the light output (L) of a cathode-ray tube is not directly proportional to the electrical input (V) but varies approximately as a power gamma ($\gamma$) in accordance with the following equation:

(8) $$L=KV^{1/\gamma}$$

Accordingly, each of the primary color signals is predistorted in an exponential amplifier and assumes the form $$R^{1/\gamma}$$

This predistortion or gamma-correction is effective and accurate for three-color reproduction, since a receiver operating on three-color principles employs reproduction signals corresponding to R, B and G which are directly applied to the electrode systems of the reproducing device or devices. However, in a "four-color" system including the same technique of gamma-correction, where the signal applied to the receiver is of the form (9) $$E=Y+[K_1(R^{1/\gamma}-Y)\sin wt+K_2(B^{1/\gamma}-Y)\cos wt]$$

in which the luminance signal is redefined as

(10) $$Y=0.1B^{1/\gamma}+0.6G^{1/\gamma}+0.3R^{1/\gamma}$$

the reproduction signals become

(11) $$E_R=R^{1/\gamma}-W^{1/\gamma}$$

(12) $$E_B=B^{1/\gamma}-W^{1/\gamma}$$

(13) $$E_G=G^{1/\gamma}-W^{1/\gamma}$$

(14) $$E_W=W^{1/\gamma}$$

whereas, for proper gamma correction they should be

(15) $$E_R(R-W)^{1/\gamma}$$

(16) $$E_B=(B-W)^{1/\gamma}$$

(17) $$E_G=(G-W)^{1/\gamma}$$

(18) $$E_W=W^{1/\gamma}$$

A further complication is introduced by the fact that the color-difference signals are not transmitted as high frequency signals; rather, they are limited to low frequency or low-definition signals of the order of 0–2 megacycles whereas the luminance signal Y is transmitted as a wide-band or total-definition signal (approximately 0–4 megacycles). Obviously, the color-difference desaturation signal N derived at the receiver is essentially a low-definition signal, since it is formed from the color-difference signals, and therefore the addition of low-definition desaturation signal N to the total-definition luminance signal Y results in the derivation of an achromatic signal W which is somewhat ambiguous in nature. Referring again to Equation 7 it is seen that

(19) $$Y=N+W=(N_A+N_L)+(W_H+W_L)$$

This may be redefined as

(20) $$Y=(W_H+N_H)+(W_L+N_L)=Y_H+W_L+N_L$$

in which $W_L$ is a low-definition color desaturation signal, $N_L$ is a low-definition color-difference desaturation signal and $Y_H$ is a high-definition luminance signal. This latter problem, however, is not so important from a practical standpoint as the difficulties in providing for accurate gamma-correction of the color reproduction signals.

Figure 2:
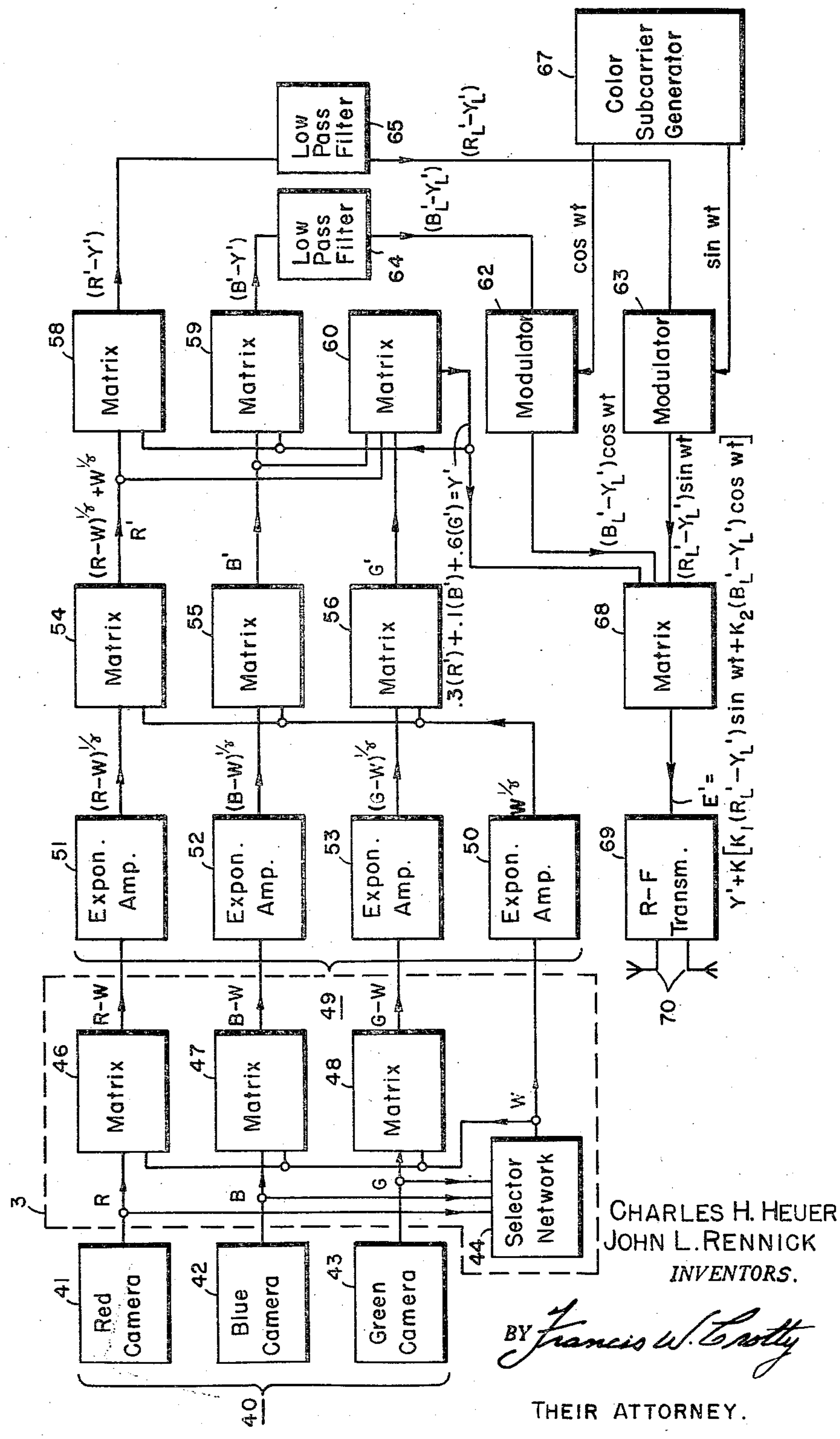
Figure 2 is a block diagram of a color television transmitter incorporating one embodiment of the invention.

The transmitter illustrated in Figure 2 incorporates one embodiment of the invention and effects accurate gamma-correction of the color signals for "four-color" reproduction. The transmitter includes an image-analyzing system 40 which comprises three color cameras, red camera 41, blue camera 42, and green camera 43. It should be understood that the three separate color cameras may be replaced by any other image-analyzing system which generates a plurality of primary color signals instantaneously representative of the color and luminance of elemental portions of a scanned image. Cameras 41, 42 and 43 are coupled to a selector network 44 and, additionally, to three matrices 46, 47 and 48 respectively. The output stage of selector network 44 is likewise coupled to each of matrices 46–48 and to an exponential amplifier 50. The output stages of matrices 46, 47 and 48 are individually coupled to three further exponential amplifiers 51, 52 and 53 respectively which form, with amplifier 50, an exponential amplifying system 49; amplifiers 51–53 are, in turn, individually connected to another set of matrices 54, 55 and 56. The output stage of exponential amplifier 50 is coupled to each of the matrices 54–56. The output stages of matrices 54 and 55 are individually coupled to two matrices 58 and 59 respectively as well as to a third matrix 60; matrix 56 is also connected to matrices 58 and 59 and the output stages of matrices 58, 59 are individually coupled to a pair of modulators 62 and 63 through individaul low-pass filters 64 and 65. A color subcarrier generator 67 is coupled to each of the modulators. The output from modulators 62 and 63 is supplied to a matrix 68 which is also coupled to the output stage of matrix 60; the output stage of matrix 68 is connected to a radio-frequency transmitter 69 which is, in turn, coupled to a radiating apparatus or antenna 70.

When the transmitter of Figure 2 is placed in operation, cameras 41–43 are trained upon an image (not shown) to be televised. The cameras generate three primary color signals R, B and G, which are instantaneously representative of the color and luminance of elemental portions of the scanned image; these three primary colors may be the commonly accepted additive primaries, red, blue and green, or any other desired additive color components. Primary color signals R, B and G are supplied to selector network 44, which derives a desaturation signal W instantaneously determined by the smallest of the primary color signals; in the present instance desaturation signal W is equal in absolute value to that smallest primary color signal. Primary color signal R and desaturation signal W are both applied to matrix 46 in which they are additively combined to develop a saturated color signal $R-W$. The term "additively combined" as used in this instance and at all other times throughout this specification and in the appended claims indicates an arithmetical combination regardless of polarities; that is to say, it may indicate either addition or subtraction. Saturated color signal $R-W$ is exactly analogous to the previously described color reproduction signal $E_R$ derived in the receiver of Figure 1 when that receiver is considered as a linear device, as indicated by Equation 4.

Saturated color signal $R-W$ is applied to exponential amplifier 51 and is modified therein to derive a gamma-corrected saturated color signal of the form $$(R-W)^{1/\gamma}$$

which is in turn supplied to matrix 54; at the same time, desaturation signal W is supplied from selector network 44 to exponential amplifier 50 and is modified therein, becoming a gamma-corrected desaturation signal $$W^{1/\gamma}$$

which is likewise applied to matrix 54. In matrix 54, the two gamma-corrected input signals are added together to form a gamma-corrected primary color signal which may be expressed as $$(R-W)^{1/\gamma}+W^{1/\gamma}$$

and is redesignated R'. Similarly, primary color signal B is transformed through matrix 47, exponential amplifier 52 and matrix 55, appearing at the output of the latter matrix as a gamma-corrected primary color signal B', while a third gamma-corrected primary color signal G' is derived at the output of matrix 56. The output signals for matrices 54–56 are thus

(21) $$R'=(R-W)^{1/\gamma}+W^{1/\gamma}$$

(22) $$B'=(B-W)^{1/\gamma}+W^{1/\gamma}$$

(23) $$G'=(G-W)^{1/\gamma}+W^{1/\gamma}$$

The three gamma-corrected primary color signals R′, B′ and G′ are all applied to matrix 60, in which they are additively combined in accordance with a preselected ratio to develop a gamma-corrected luminance signal Y′ which may be expressed as

(24)
$$Y'=0.1B'+0.6G'+0.3R'-0.1(B-W)^{1/\gamma}+W^{1/\gamma}+0.6(G-W)^{1/\gamma}+W^{1/\gamma}+0.3(R-W)^{1/\gamma}+W^{1/\gamma}$$

It should be noted that the basic character of the luminance signal remains unchanged, and, by analogy with equation (7) it may be shown to satisfy the following relationship:

(25) $$Y'=W^{1/\gamma}+N'$$

where N′ is equivalent to N but is derived after the application of gamma correction in accordance with "four-color" principles. Signal Y′ is supplied to matrices 58 and 59 and is additively combined therein with signals R′ and B′ respectively to derive two gamma-corrected color-difference signals $R'-Y'$ and $B'-Y'$. Red color-difference signal $R'-Y'$ is supplied to modulator 63 through low-pass filter 65, appearing at the modulator as a low-definition gamma-corrected color-difference signal $(R_L'-Y_L')$. In modulator 63, the color-difference signal is employed to modulate a color subcarrier signal which may be expressed as sin $wt$, $w$ being of a preselected frequency usually equal to an integral multiple of ½ the line-scanning frequency of image-analyzing system 40. Thus, the output signal from modulator 63 is of the form $(R_L'-Y_L')$ sin $wt$. Similarly, blue color-difference signal $B'-Y'$ is translated through low-pass filter 64 and applied to modulator 62 wherein it issued to modulate another component of the subcarrier signal developed in generator 67, the output of modulator 62 being $(B_L'-Y_L')$ cos $wt$.

The output signals from modulators 62 and 63 and matrix 60 are all supplied to matrix 68 in which they are used to develop a signal expressed as

(26)
$$E'-Y'+K[K_1(R_L'-Y_L')\sin wt+K_2(B_L'-Y_L')\cos wt]$$

signal E′ is then applied to radio-frequency transmitter 69 and is employed therein to modulate a locally generated carrier signal. The output of transmitter 69 is supplied to antenna 70 and radiated so that it may be picked up by antenna 10 of the receiver of Figure 1.

The receiver of Figure 1 responds to the signal radiated from the transmitter of Figure 2 in precisely the same manner as with the normal NTSC signal. Accordingly, the output of matrices 30, 31 and 32 are of the form $$R'-W^{1/\gamma},\ B'-W^{1/\gamma}\text{ and }G'-W^{1/\gamma}$$

respectively. However, as indicated above, R′ is equivalent to $$(R-W)^{1/\gamma}+W^{1/\gamma}$$

and as a result the reproduction or control signal applied to electrode system 37R becomes $$(R-W)^{1/\gamma}$$

and the signals applied to the electrode systems 37B and 37G are of the form $$(B-W)^{1/\gamma}$$

and $$(G-W)^{1/\gamma}$$

In addition, the output of matrix 33 becomes $$W^{1/\gamma}$$

It is therefore apparent that the reproduction signals used to control image reproducing system 35 are gamma-corrected, not in accordance with the primary color signals, but rather in accordance with the saturated color signals. Consequently, the color values of the "four-color" image reproduced by the receiver of Figure 1 in response to the signal radiated by the transmitter of Figure 2 are accurately corrected and include no inherent color distortion factor.

Figure 3:
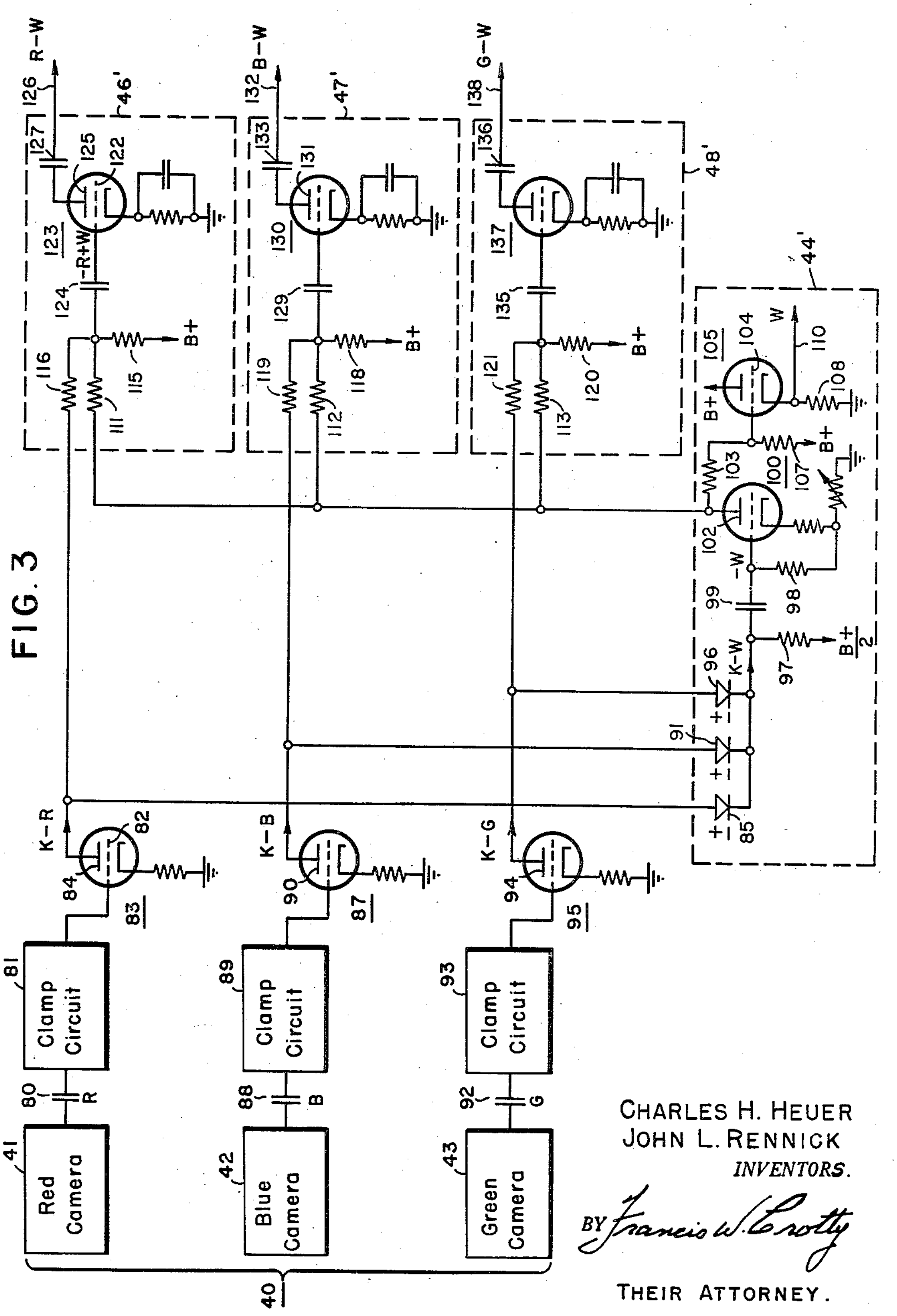
Figure 3 is a simplified circuit diagram of a portion of Figure 2.

The circuit diagram of Figure 3 illustrates a specific arrangement of circuit elements for that portion of the transmitter of Figure 2 enclosed in dash line 3; this particular circuit has been employed to modify a standard type NTSC transmitter for development of a "four-color" signal. In Figure 3, the output circuit of red camera 41 is connected through a capacitor 80 and a clamp circuit 81 to the control electrode 82 of a vacuum tube amplifier 83. Clamp circuit 81 may be of any well known type which will maintain the direct-current level of the signal at a given reference level; similarly, the exact type of tube used in amplifier 83 is unimportant and it is hence shown as a triode. The anode 84 of amplifier 83 is coupled to a rectifier 85, which may take the form of a vacuum tube diode, a crystal diode, or any other suitable rectifier. Similarly, the output circuit of blue camera 42 is coupled to an amplifier 87 through a capacitor 88 and a clamp circuit 89 and the anode 90 of the amplifier is in turn coupled to a rectifier 91; the same type of circuit is coupled to green camera 43 and includes a capacitor 92, a clamp circuit 93, an amplifier 95 and a rectifier 96. The three negative terminals of diodes 85, 91 and 96 are connected together and to a common load resistor 97 which is in turn coupled to a source of bias potential B+/2. Load resistor 97 is coupled to a bias resistor 98 through a capacitor 99 to form the input circuit of an inverter and amplifier 100. The anode 102 of device 100 is connected through a resistor 103 to the control grid 104 of a buffer stage 105 and is also connected to a source of biasing potential B+ through a resistor 107. Buffer 105 includes a cathode resistor 108 connected to a source of reference potential and an output lead 110.

Anode 102 of inverter 100 is also connected to three load resistors 111, 112, and 113. The other terminal of resistor 111 is coupled to a matrix resistor 115 and the junction between resistors 111 and 115 is connected to anode 84 of amplifier 83 through a resistor 16. Similarly, resistor 112 is connected to a matrix resistor 118 and to a load resistor 119 connected to anode 90 of amplifier 87, and resistor 113 is connected to a matrix resistor 120 and to a load resistor 121 coupled to the anode 94 of amplifier 95. Each of the matrix resistors 115, 118 and 120 is connected to bias source B+. The junction between resistors 111, 115 and 116 is connected to the control electrode 122 of an amplifier 123 through a capacitor 124; the anode 125 of amplifier 123 is coupled to an output lead 126 through a capacitor 127. Matrix resistor 118 is coupled in similar fashion through a capacitor 129 to an amplifier 130 having an anode 131 coupled to an output lead 132 through a capacitor 133; matrix resistor 120, capacitors 135 and 136 and amplifier 137, along with output lead 138, are similarly connected.

When the circuit of Figure 3 is incorporated in the transmitter of Figure 2 and placed in operation, color cameras 41, 42 and 43 scan an image and develop three primary color signals R, B and G; these primary signals are applied to amplifiers 83, 87 and 95 respectively, the direct current level of each of the signals being maintained by clamping circuits 81, 89 and 93 respectively. The output signal from amplifier 83 is of the form $K-R$, in which K represents a constant current level and R, ignoring amplification, corresponds to the output of camera 41 but is inverted in polarity. Accordingly, the output signals from amplifiers 83, 87, and 95 ($K-R$, $K-B$ and $K-G$ respectively) may be considered as equivalent to the primary color signals but of opposite polarity. These signals are applied to diodes 85, 91 and 96 respectively and as a result the signal voltage appearing across resistor 97 represents that one of the inverted primary signals having the greatest positive amplitude. Due to the inverted character of the signal, the voltage across resistor 97 corresponds to the smallest of the original primary color signals and is of the form $K-W$. The direct-current component K of the signal voltage appearing across resistor 97 is blocked by condenser 99; as a result the signal voltage appearing across resistor 98 represents color desaturation signal W but is of inverted polarity.

In inverter stage 100, the signal applied to resistor 98 is inverted and appears at the output of the stage as a positive polarity color desaturation signal W; this signal is applied to buffer stage 105 through resistor 103 and appears at output lead 110 in essentially unchanged form. At the same time, desaturation signal W is applied to resistor 111 and the inverted primary color signal $K-R$ is applied to resistor 116; consequently, the signal voltage appearing across matrix resistor 115 represents the additive combination of the two applied signals and may be expressed as $K-R+W$. The capacitive coupling provided by capacitor 124 precludes translation of the direct current component K and the input signal to amplifier 123 is therefore equivalent to $-R+W$. The output signal from amplifier 123 is, of course, inverted in polarity with respect to the input signal and the signal appearing at lead 126 may thus be expressed as $R-W$. Inasmuch as the signals applied to resistors 116 and 111 are equivalent to the primary color signal R, inverted in polarity, and desaturation signal W, and the output signal from lead 126 is of the form $R-W$, it becomes apparent that that portion of the circuit enclosed within dash line 46' represents matrix 46 of Figure 2.

Examination of the circuit of Figure 3 indicates that that portion of the circuit enclosed within dash outline 47' is precisely analogous to that of matrix 46' and that this portion of the circuit may be equated to matrix 47 of Figure 2 having an output signal $B-W$; similarly, dash outline 48' corresponds to matrix 48 of Figure 2 and has an output signal of the form $G-W$. Furthermore, selector network 44 of Figure 2 may be considered as represented by that portion of Figure 3 enclosed in broken outline 44', inasmuch as the input signals to section 44' represent the primary color signals, although inverted in polarity, and the output signal derived therefrom corresponds to color desaturation signal W. It will be recognized that the amplification factors of the various stages of the circuit of Figure 3 have been omitted with reference to the signals derived; this has been done merely to clarify and simplify the explanation.

Figure 4:
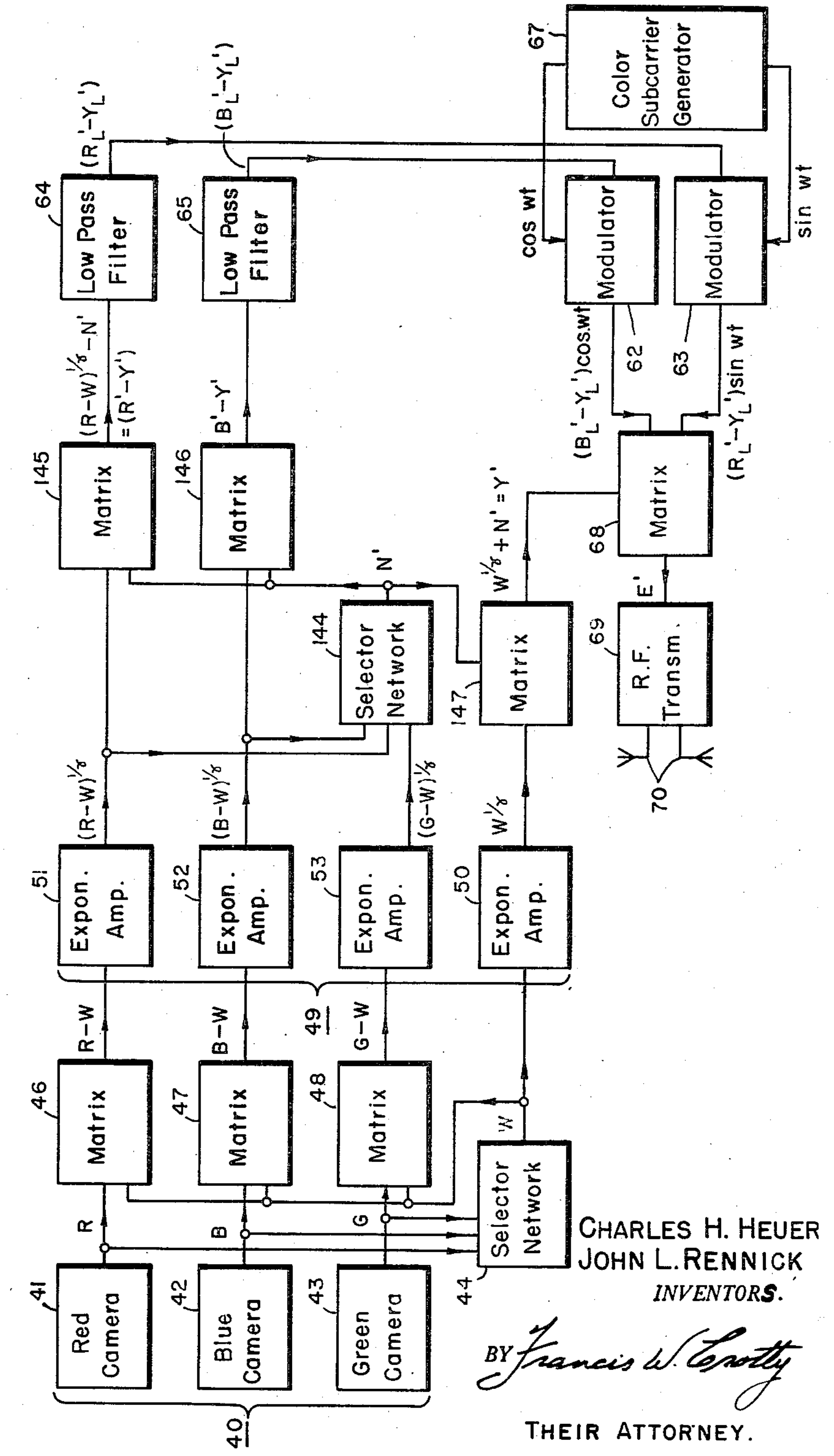
Figure 4 is a block diagram of a color television transmitter incorporating a second embodiment of the invention.

The transmitter illustrated in Figure 4 is basically similar to that of Figure 2; as before, image-analyzing system 40, including cameras 41–43, is coupled to selector 44 and to matrices 46–48, the selector network also being coupled to each of the matrices. An exponential amplifying system 49 including amplifiers 50–53 is incorporated in this transmitter in exactly the same manner as in Figure 2. However, in this embodiment the output stages of amplifiers 51, 52 and 53 are coupled to a second selector network 144 which is in turn connected to a pair of matrices 145 and 146. Matrices 145 and 146 are also coupled to the output stages of amplifiers 51 and 52 respectively. The output of selector network 144 is also coupled to a matrix 147 and the output stage of amplifier 50 is likewise connected to this matrix. The load circuits of matrices 145 and 146 are individually coupled to modulators 62 and 63 through low-pass filters 64 and 65 respectively and the output of the two modulators is coupled to matrix 68 as in Figure 2. A color subcarrier generator is also coupled to modulators 62, 63 as in Figure 2. The output stage of matrix 147 is connected to matrix 68 which is, in turn, coupled to antenna 70 through radio-frequency transmitter 69.

In operation, the primary stages of the transmitter of Figure 4 function in exactly the same manner as their counterparts in Figure 2 and the signals derived from exponential amplifying system 49 are equivalent to $$(R-W)^{1/\gamma},\ (G-W^{1/\gamma},\ (B-W)^{1/\gamma} \text{ and } W^{1/\gamma}$$

Here, however, the three gamma-corrected saturated color signals are applied to selector network 144, which develops an output signal representative of that saturated color signal having the instantaneous greatest negative amplitude. Examination of the foregoing equations indicates that the output from selector 144 represents a gamma-corrected color-difference desaturation signal N'. In matrix 145, to which signal N' is applied, the color-difference desaturation signal is additively combined with the saturated color signal from amplifier 51 to form a signal of the form $$(R-W)^{1/\gamma}-N'$$

however, this may be alternatively expressed as $$(R-W)^{1/\gamma}-(N'+W^{1/\gamma})W^{1/\gamma}$$

which, from Equation 25, is equivalent to $$(R-W)^{1/\gamma}-Y'+W^{1/\gamma}$$

This latter expression, according to Equation 21, reduces to $R'-Y'$. Similarly, the output signal derived from matrix 146 represents $B'-Y'$.

At the same time, desaturation signal N' is added in matrix 147 to the gamma-corrected color desaturation signal $$W^{1/\gamma}$$

supplied from amplifier 50. The resulting output signal from matrix 147 is, therefore, of the form $$W^{1/\gamma}+N'$$

which is equal to Y' as indicated by Equation 25. From this point on, the operation of the transmitter is exactly analogous to that of Figure 2 and the output signal radiated by antenna 70 may again be expressed as

(27)
$$E'=Y'+K[K_1(R_L'-Y_L')\sin wt+K_2(B_L'-Y_L')\cos wt]$$

The effect of this signal on the receiver of Figure 1 is identical with that of the signal broadcast by the transmitter of Figure 2, since the signals are identical in form as shown by a comparison of Equations 26 and 27.

Figure 5:
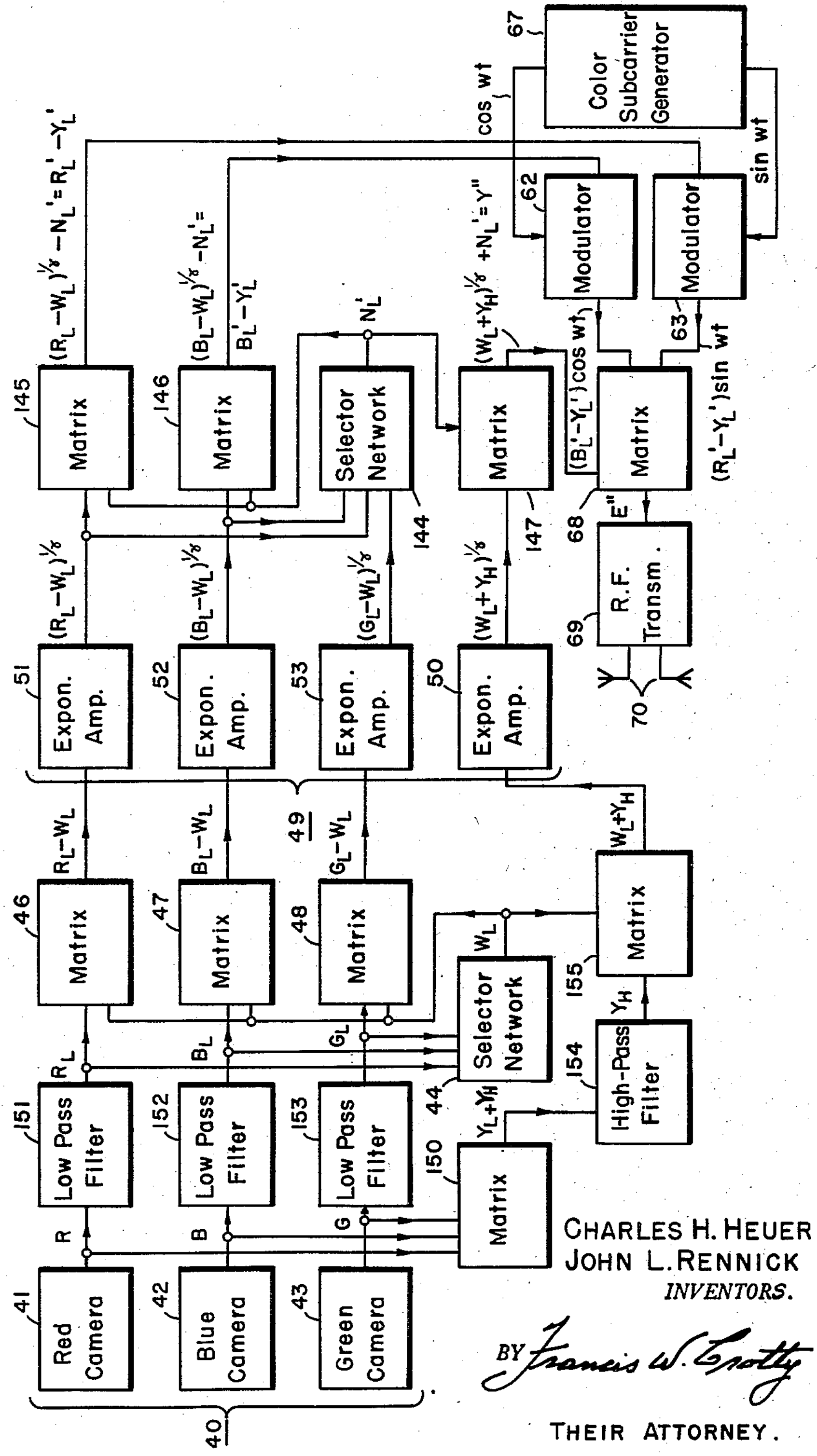
Figure 5 is a block diagram of a color television transmitter incorporating another embodiment of the invention.

Referring to Figure 5, it becomes apparent that the transmitter illustrated therein is somewhat different in its structural details from that of Figures 2 and 4. In this embodiment, the output circuits of the image-analyzing system are coupled to a matrix 150; in addition, cameras 41, 42 and 43 are individually coupled to three low-pass filters 151, 152 and 153 respectively. From this point on, however, the transmitter is essentially identical with that of Figure 4 insofar as the color signal channels are concerned; that is to say, selector 44, matrices 46–48, exponential amplifiers 51–53, second selector network 144, and matrices 145 and 146 are basically equivalent in structure to the above-described devices and are coupled together in exactly the same manner as in Figure 4. The luminance signal generating circuit, however, is constructed somewhat differently. The output stage of matrix 150 is connected to a high-pass filter 154 which is in turn coupled to a matrix 155. The output stage of selector 44 is also coupled to matrix 155, and the output of the matrix is coupled to exponential amplifier 50. From this point on, the structure and organization of the transmitter is equivalent to that of Figure 4, matrix 147, modulators 62 and 63, color subcarrier generator 67, matrix 68, transmitter 69 and antenna 70 being coupled to the previously recited circuit components in exactly the same fashion as before. It should be noted that low-pass filters 64 and 65 do not appear in this embodiment.

In operation, the transmitter of Figure 5 supplies the primary color signals R, B and G directly from image-analyzing system 40 to the three low-pass filters 151, 152 and 153 respectively; as a result, the signals translated by the filters are equivalent to the primary color signals but are of reduced frequency range and therefore may be described as coarse-or low-definition signals. These low-definition primary color signals are indicated $R_L$, $G_L$, and $B_L$ respectively, the subscript L being used generally to indicate low-definition signals. Inasmuch as matrices 145 and 146 and the stages between those two matrices and filters 151–153 are all supplied only with low-definition information, but are otherwise exactly similar to the corresponding portion of the transmitter of Figure 4, it is immediately apparent that the output signals from matrices 145 and 146 will be precisely similar in form to those derived at the same stage in the transmitter of Figure 4. Accordingly, these signals are of the form $R_L'-Y_L'$ and are only representative of low-definition information, their reduced frequency bandwidth making it possible to apply the signals directly from matrices 145, 146 to modulators 62 and 63 respectively without interposing low-pass filters.

In matrix 150, the total-definition primary color signals R, B and G are additively combined in a preselected ratio to derive a total-definition luminance signal as expressed by Equation 1. This luminance signal is applied to high pass filter 154, which is complementary to filters 151–153. Accordingly, the output of filter 154 represents that portion of the total luminance signal exclusive of the similar information contained in the low-definition primary color signals derived from low-pass filters 151–153 and may be designated as a high-definition luminance signal $Y_H$ in accordance with Equation 20. The high-definition luminance signal $Y_H$ is applied to matrix 155 along with the low-definition color desaturation signal $W_L$ derived from selector 44; the additive combination of these two input signals results in the formation of a mixed-definition achromatic reproduction signal $(W_L+Y_H)$ which is in turn supplied to exponential amplifier 50. From this point on, the transmitter is precisely similar to that of Figure 4 and the operations need not be restated in detail.

In comparing the operation of Figures 4 and 5, it is readily apparent that the chief difference between the two is in the output signal derived from exponential amplifier 50 and therefore in the luminance signal appearing in the radiated telecast. Substituting this quantity in the ultimate telecast equation results in a signal of the form $$(28)\quad E''=Y''+K[K_1(R_L'-Y_L')\sin wt+K_2(B_L'-Y_L')\cos wt]$$

in which $$(29)\quad Y''=(Y_H+W_L)^{1/\gamma}+N_L'$$

Referring back to Figure 1, the output from matrix 33 in that figure is now represented by a signal of the form $$(W_L+Y_H)^{1/\gamma}$$

rather than the previously derived $$W^{1/\gamma}$$

Actually, as may be seen by reference to Equations 19 and 20, the achromatic reproduction signal or color desaturation signal W, as originally derived, may be expressed as $$(30)\quad W=Y-N=Y_L+Y_H-N_L-N_H$$

It is not possible to eliminate from this term both of the color difference desaturation components, $N_H$ and $N_L$ when using the standard type of transmission, due to the fact that only the information necessary to derive $N_L$ is transmitted. Accordingly, the mixed-definition achromatic reproduction signal derived in the transmitter of Figure 5 and broadcast as a part of luminance signal Y'' is theoretically more accurate than the total-definition signal Y' radiated by the transmitters of Figures 2 and 4. However, it should be noted that the actual effective differences to an observer viewing screen 36 of the receiver of Figure 1 may be insignificant.

Figure 6:
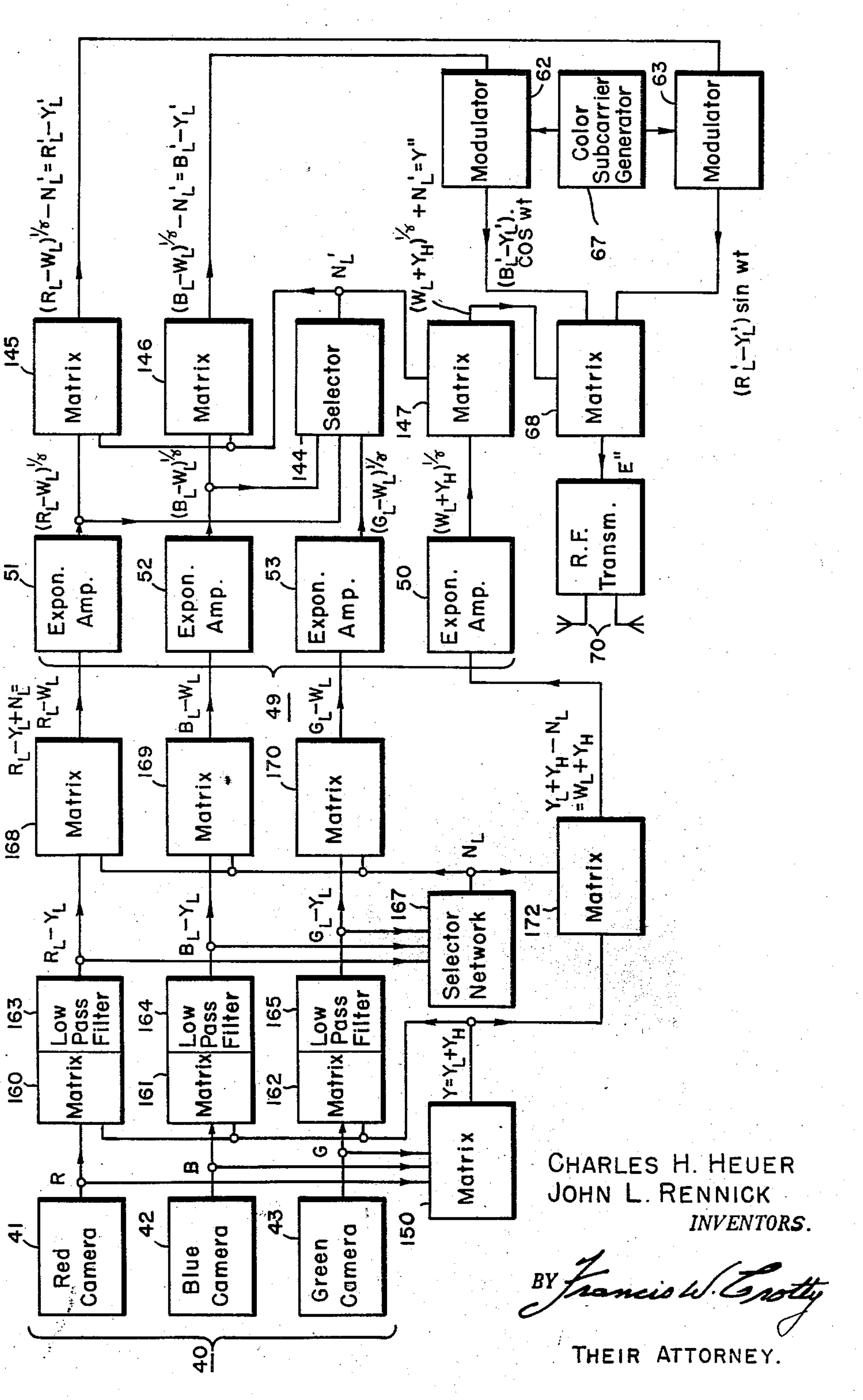
Figure 6 is a block diagram of a color television transmitter including an additional embodiment of the invention.

In the embodiment illustrated in Figure 6, cameras 41, 42, and 43 are coupled to three matrices 160, 161 and 162 respectively and are also coupled to another combining means, matrix 150. The output stage of matrix 150 is also coupled to matrices 160, 161 and 162 which are in turn connected to three low-pass filters 163, 164 and 165 respectively. The output stage of each of the low-pass filters is coupled to a selector network 167 which is in turn connected to three matrices 168, 169 and 170, the latter three matrices also being coupled to the output stages of filters 163, 164 and 165 respectively. The output of selector 167 is also coupled to a matrix 172 which is similarly coupled to the output of matrix 150. The output stages of matrices 168, 169, 170 and 172 are individually coupled to exponential amplifiers 51, 52, 53 and 50 respectively. The remainder of the transmitter, including matrices 145 and 146, selector 144, matrix 147, modulators 62, 63, generator 67, matrix 68, RF transmitter 69 and antenna 70 are analogous in structure to the corresponding circuits of Figures 4 and 5 and are interconnected in exactly the same manner as in those figures.

When the transmitter of Figure 6 is placed in operation, the primary color signals R, B and G derived from image-analyzing system 40 are additively combined in matrix 150 to derive a total-definition luminance signal of the general form indicated in Equation 1. This signal is applied to matrix 160 wherein it is additively combined with the primary color signal R to derive a color-difference signal $R-Y$ which is translated through low-pass filter 163 and appears at the output stage thereof as a low-definition color-difference signal designated $R_L-Y_L$. Considered as a unit, matrix 160 and filter 163 form a frequency-selective circuit which additively combines the luminance signal with a primary color signal to generate a low-definition color-difference signal. The two similar structures, one incorporating matrix 161 and filter 164 and the other including matrix 162 and filter 165, generate two additional low-definition color-difference signals designated $B_L-Y_L$ and $G_L-Y_L$ respectively. The three low-definition color-difference signals are applied to selector 167 which derives a signal representative of the largest of the color-difference signals and which, by definition above, is termed a color-difference desaturation signal. It will be apparent from the foregoing analysis that $N_L$, the output from selector 167, is instantaneously determined by the smallest of the primary color signals R, B and G and in this instance is necessarily a low-definition signal, since the components from which it is derived are all low-definition signals. Desaturation signal $N_L$ and color difference signal $R_L-Y_L$ are applied to matrix 168, in which the two signals are additively combined to develop a saturated color signal $(R_L-Y_L+N_L)$, which, by analogy with Equation 19, is equivalent to $R_L-W_L$. In similar fashion, the desaturation signal is applied to matrix 169 along with the blue color-difference signal and results in formation of a low-definition saturated color signal $B_L-W_L$; by the same process, the output from matrix 170 appears as the low-definition saturated color signal $G_L-W_L$. At the same time, the luminance signal developed in matrix 150, which may be considered as representing the sum of the low-definition and high definition luminance components $Y_L$ and $Y_H$, is applied to matrix 172 concurrently with desaturation signal $N_L$. In matrix 172, these two components are additively combined and the resulting output is of the form $(Y_L+Y_H-N_L)$. However, since $Y_L=W_L+N_L$, the output signal from matrix 172 may be reduced to the form $W_L+Y_H$. This is recognized as equivalent to the output of matrix 155 of Figure 5 and, as in that embodiment, is applied to exponential amplifier 50. The remaining components of the transmitter are in all essential respects equivalent to those of Figure 5 and a recapitulation of the operation thereof is not necessary. In this embodiment, as in that of Figure 5, the output signal radiated by antenna 70, disregarding the carrier frequency signal, is of the form $$(31)\quad E''=Y''+K[K_1(R_L'-Y_L')\ \sin\ wt+K_2(B_L'-Y_L')\ \cos\ wt]$$

In connection with the transmitters illustrated in Figures 2, 4, 5 and 6, it should be understood that the choice of primary colors is to a great extent arbitrary and may be varied to include any useful group of additive primaries; in addition, the number of those primary colors need not necessarily be restricted to three, inasmuch as the basic teaching of the invention is equally applicable to systems using four or more primaries and others in which the primaries are shifted in transmitter stages subsequent to image-analyzing system 40. The output signal equations are primarily illustrative, since it is apparent that a change in the constants of Equation 2, although resulting in a somewhat modified composite telecast, does not alter the basic requirements for gamma-correction. The terms low-definition and high-definition need not be restricted to division of the primary color signals into equally extensive frequency bands; rather, the division may be on any desired ratio and may be unequal with respect to different color channels.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a color television transmitter including an image-analyzing system which supplies a plurality of primary color signals instantaneously representative of the color and luminance of elemental portions of a scanned image, a gamma-correction system comprising: a selector network, coupled to said image-analyzing system, for deriving a desaturation signal instantaneously determined by the smallest in amplitude of said primary color signals; matrix means, coupled to said selector network and said image-analyzing system for additively combining said desaturation signal with each of said primary color signals to derive a corresponding plurality of saturated color signals; an exponential amplifying system coupled to said matrix means for developing a corresponding plurality of gamma-corrected saturated color signals; and means coupled to said exponential amplifying system for utilizing said gamma-corrected saturated color signals to derive at least two gamma-corrected color-difference signals.

2. In a color television transmitter including an image-analyzing system which supplies a plurality of primary color signals instantaneously representative of the color and luminance of elemental portions of a scanned image, a gamma-correction system comprising: a selector network, coupled to said image-analyzing system, for deriving a color desaturation signal instantaneously determined by the smallest in amplitude of said primary color signals; first matrix means, coupled to said selector network and to said image-analyzing system, for additively combining said desaturation signal with each of said primary color signals to derive a corresponding plurality of saturated color signals; an exponential amplifying system, coupled to said first matrix means and to said selector network, for developing a corresponding plurality of gamma-corrected saturated color signals and a gamma-corrected color desaturation signal; and additional matrix means, coupled to said exponential amplifying system, for additively combining said gamma-corrected color desaturation signal with said gamma-corrected saturated color signals to generate a plurality of gamma-corrected primary color signals.

3. In a color television transmitter including an image-analyzing system which supplies a plurality of primary color signals instantaneously representative of the color and luminance of elemental portions of a scanned image, a gamma-correction system comprising: a first selector network, coupled to said image-analyzing system, for deriving a color desaturation signal instantaneously determined by the smallest in amplitude of said primary color signals; first matrix means, coupled to said selector network and said image-analyzing system, for additively combining said desaturation signal with each of said primary color signals to derive a corresponding plurality of saturated color signals; an exponential amplifying system, coupled to said first matrix means, for developing a corresponding plurality of gamma-corrected saturated color signals; a second selector network, coupled to said exponential amplifying system, for generating a gamma-corrected color-difference desaturation signal instantaneously determined by the smallest of said primary color signals; and additional matrix means, coupled to said exponential amplifying system and to said second selector network, for additively combining said gamma-corrected color-difference desaturation signal with at least two of said gamma-corrected saturated color signals to derive at least two gamma-corrected color-difference signals.

4. In a color television transmitter including an image-analyzing system which supplies a plurality of primary color signals instantaneously representative of the color and luminance of elemental portions of a scanned image, a gamma-correction system comprising: a selector network, coupled to said image-analyzing system, for deriving a color desaturation signal instantaneously determined by the smallest in amplitude of said primary color signals; first matrix means, coupled to said selector network and to said image analyzing system, for additively combining said desaturation signal with each of said primary color signals to derive a corresponding plurality of saturated color signals; an exponential amplifying system, coupled to said first matrix means and to said selector network, for developing a corresponding plurality of gamma-corrected saturated color signals and a gamma-corrected color desaturation signal; second matrix means, coupled to said exponential amplifying system, to additively combine said gamma-corrected color desaturation signal with said gamma-corrected saturated color signals to generate a plurality of gamma-corrected primary color signals; combining means, coupled to said second matrix means, for additively combining said gamma-corrected primary color signals in accordance with a preselected ratio to develop a gamma-corrected luminance signal; and additional matrix means, coupled to said second matrix and said combining means, for additively combining said gamma-corrected luminance signal with at least two of said gamma-corrected primary color signals to derive at least two gamma-corrected color-difference signals.

5. In a color television transmitter including an image-analyzing system which supplies a plurality of primary color signals instantaneously representative of the color and luminance of elemental portions of a scanned image, a gamma-correction system comprising: a first selector network, coupled to said image-analyzing system, for deriving a color desaturation signal instantaneously determined by the smallest in amplitude of said primary color signals; first matrix means, coupled to said selector network and to said image analyzing system, for additively combining said desaturation signal with each of said primary color signals to derive a corresponding plurality of saturated color signals; an exponential amplifying system, coupled to said first matrix means and to said selector network, for developing a corresponding plurality of gamma-corrected saturated color signals and a gamma-corrected color desaturation signal; a second selector network, coupled to said exponential amplifying system, for generating a gamma-corrected color-difference desaturation signal instantaneously determined by the smallest of said primary color signals; and additional matrix means, coupled to said second selector network and said exponential amplifying system, for additively combining said gamma-corrected desaturation signals to generate a gamma-corrected luminance signal.

6. In a color television transmitter including an image-analyzing system which supplies a plurality of primary color signals instantaneously representative of the color and luminance of elemental portions of a scanned image, a gamma-correction system comprising: a frequency selective system, coupled to said image-analyzing system, for developing a corresponding plurality of low-definition primary color signals; a selector network, coupled to said frequency selective system, for deriving a low-definition color desaturation signal instantaneously determined by the smallest amplitude of said primary color signals; first matrix means, coupled to said selector network, for additively combining said desaturation signal with each of said low-definition primary color signals to derive a corresponding plurality of low-definition saturated color signals; frequency-selective combining means, coupled to said image-analyzing system, for additively combining said primary color signals in accordance with a preselected ratio to develop a high-definition luminance signal; second matrix means, coupled to said frequency-selective combining means and said selective network, for additively combining said low-definition desaturation signal and said high-definition luminance signal to derive a mixed definition achromatic reproduction signal; and an exponential amplifying system, coupled to said first matrix means and to said second matrix means, for developing a corresponding plurality of low-definition gamma-corrected saturated color signals and a gamma-corrected mixed-definition achromatic reproduction signal.

7. In a color television transmitter including an image-analyzing system which supplies a plurality of primary color signals instantaneously representative of the color and luminance of elemental portions of a scanned image, a gamma-correction system comprising: a frequency selective system, coupled to said image-analyzing system, for developing a corresponding plurality of low-definition primary color signals; a first selector network, coupled to said frequency selective system, for deriving a low-definition color desaturation signal instantaneously determined by the smallest amplitude of said primary color signals; first matrix means, coupled to said selector network, for additively combining said desaturation signal with each of said low-definition primary color signals to derive a corresponding plurality of low-definition saturated color signals; frequency-selective combining means, coupled to said image-analyzing system, for additively combining said primary color signals in accordance with a preselected ratio to develop a high-definition luminance signal; second matrix means, coupled to said frequency-selective combining means and said selective network, for additively combining said low-definition color desaturation signal and said high-definition luminance signal to derive a mixed-definition achromatic reproduction signal; an exponential amplifying system coupled to said first matrix means and to said second matrix means, for developing a corresponding plurality of low-definition gamma-corrected saturated color signals and a gamma-corrected mixed-definition achromatic reproduction signal; a second selector network, coupled to said exponential amplifying system, for generating a low-definition gamma-corrected color-difference desaturation signal instantaneously determined by the smallest of said primary color signals; and additional matrix means, coupled to said exponential amplifying system and said second selector network, for additively combining said low-definition gamma-corrected color-difference desaturation signal and said gamma-corrected mixed-definition achromatic reproduction signal to derive a gamma-corrected luminance signal.

8. In a color television transmitter including an image-analyzing system which supplies a plurality of primary color signals instantaneously representative of the color and luminance of elemental portions of a scanned image, a gamma-correction system comprising: combining means, coupled to said image-analyzing system, for additively combining said primary color signals in accordance with a preselected ratio to develop a total-definition luminance signal; frequency-selective matrix means, coupled to said combining means and said image-analyzing system, for additively combining said luminance signal with each of said primary color signals to generate a corresponding plurality of low-definition color-difference signals; a selector network, coupled to said frequency selective matrix means, for deriving a low-definition color-difference desaturation signal instantaneously determined by the smallest amplitude of said primary color signals; additional matrix means, coupled to said selector network and said frequency-selective matrix means, for additively combining said desaturation signal with each of said low-definition color-difference signals to derive a corresponding plurality of low-definition saturated color signals; and an exponential amplifying system, coupled to said additional matrix means, for developing a corresponding plurality of low-definition gamma-corrected saturated color signals.

9. In a color television transmitter including an image-analyzing system which supplies a plurality of primary color signals instantaneously representative of the color and luminance of elemental portions of a scanned image, a gamma-correction system comprising: combining means, coupled to said image-analyzing system, for additively combining said primary color signals in accordance with a preselected ratio to develop a total-definition luminance signal; frequency-selective matrix means, coupled to said combining means and said image-analyzing system, for additively combining said luminance signal with each of said primary color signals to generate a corresponding plurality of low-definition color-difference signals; a selector network, coupled to said frequency selective matrix means, for deriving a low-definition color-difference desaturation signal instantaneously determined by the smallest amplitude of said primary color signals; second matrix means, coupled to said selector network and said frequency-selective matrix means, for additively combining said desaturation signal with each of said low-definition color-difference signals to derive a corresponding plurality of low-definition saturated color signals; third matrix means, coupled to said selector network and to said frequency-selective matrix means, for additively combining said total-definition luminance signal with said low-definition color-difference desaturation signal to derive a mixed-definition achromatic reproduction signal; and an exponential amplifying system, coupled to said second and third matrix means, for developing a corresponding plurality of low-definition gamma-corrected saturated color signals and a gamma-corrected mixed-definition achromatic reproduction signal.

10. In a color television transmitter including an image-analyzing system which supplies a plurality of primary color signals instantaneously representative of the color and luminance of elemental portions of a scanned image, a gamma-correction system comprising: combining means, coupled to said image-analyzing system, for additively combining said primary color signals in accordance with a preselected ratio to develop a total-definition luminance signal; frequency-selective matrix means, coupled to said combining means and said image-analyzing system, for additively combining said luminance signal with each of said primary color signals to generate a corresponding plurality of low-definition color-difference signals; a first selector network, coupled to said frequency selective matrix means, for deriving a low-definition color-difference desaturation signal instantaneously determined by the smallest amplitude of said primary color signals; second matrix means, coupled to said first selector network and said frequency-selective matrix means, for additively combining said desaturation signal with each of said low-definition color-difference signals to derive a corresponding plurality of low-definition saturated color signals; third matrix means, coupled to said selector network and to said frequency-selective matrix means, for additively combining said total-definition luminance signal with said low-definition color-difference desaturation signal to derive a mixed-definition achromatic reproduction signal; an exponential amplifying system, coupled to said second and third matrix means, for developing a corresponding plurality of low-definition gamma-corrected saturated color signals and a gamma-corrected mixed-definition achromatic reproduction signal; a second selector network, coupled to said exponential amplifying system, for generating a low-definition gamma-corrected color-difference desaturation signal instantaneously determined by the smallest of said primary color signals; and third matrix means, coupled to said exponential amplifying system and said second selector network, for additively combining said low-definition gamma-corrected color-difference desaturation signal and said gamma-corrected mixed definition achromatic reproduction signal to derive a gamma-corrected luminance signal.

References Cited in the file of this patent

UNITED STATES PATENTS

| | | |
|---|---|---|
| 2,316,581 | Hardy et al. | Apr. 13, 1943 |
| 2,634,324 | Bedford | Apr. 7, 1953 |
| 2,646,463 | Schroeder | July 21, 1953 |
| 2,684,995 | Schroeder | July 27, 1953 |